US010803086B2

(12) United States Patent
Renauld et al.

(10) Patent No.: US 10,803,086 B2
(45) Date of Patent: Oct. 13, 2020

(54) REDUCING DATA AMPLIFICATION WHEN RESYNCHRONIZING COMPONENTS OF AN OBJECT REPLICATED ACROSS DIFFERENT SITES

(71) Applicant: VMware, Inc., Palo Alto, CA (US)

(72) Inventors: Pascal Renauld, Palo Alto, CA (US); Enning Xiang, San Jose, CA (US); Eric Knauft, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 609 days.

(21) Appl. No.: 15/660,753

(22) Filed: Jul. 26, 2017

(65) Prior Publication Data

US 2019/0034505 A1 Jan. 31, 2019

(51) Int. Cl.

*G06F 16/30* (2019.01)
*G06F 16/27* (2019.01)
*G06F 9/455* (2018.01)
*G06F 3/06* (2006.01)
*G06F 16/188* (2019.01)

(52) U.S. Cl.

CPC .............. *G06F 16/27* (2019.01); *G06F 3/065* (2013.01); *G06F 3/067* (2013.01); *G06F 3/0619* (2013.01); *G06F 3/0665* (2013.01); *G06F 3/0689* (2013.01); *G06F 9/45558* (2013.01); *G06F 16/188* (2019.01); *G06F 2009/45583* (2013.01); *G06F 2009/45595* (2013.01)

(58) Field of Classification Search

CPC ................................ G06F 16/27; G06F 3/065
See application file for complete search history.

(56) References Cited

U.S. PATENT DOCUMENTS

2010/0153617 A1* 6/2010 Miroshnichenko ..... G06F 3/061 711/6
2013/0282653 A1* 10/2013 Tandra Sistla ...... G06F 9/45558 707/610
2015/0058306 A1* 2/2015 Earl .................... G06F 16/1774 707/703
2015/0261455 A1* 9/2015 Gough .................... H04L 69/40 714/6.24
2018/0343019 A1* 11/2018 Xiang ............... H03M 13/1515
2018/0357140 A1* 12/2018 Xiang ................ G06F 11/1076

OTHER PUBLICATIONS

Article entitled "The Use of Erasure Coding in VMware Virtual SAN 6.2", dated Feb. 12, 2016, by Karamanolis.*
Article entitled "How to Understand Space Requirements for FTT with RAID-1 and VSAN", dated Feb. 20, 2016, by Xu.*

* cited by examiner

*Primary Examiner* — Mahesh H Dwivedi
(74) *Attorney, Agent, or Firm* — Patterson + Sheridan, LLP

(57) ABSTRACT

Component objects of a virtual disk are backed by first storage nodes, which are at a primary site, and second storage nodes, which are at a secondary site. The method of resynchronizing the component objects of the virtual disk includes, at a coordinating node at the primary site, responsive to a second storage node coming back online, identifying an out-of-sync block of the second storage node, locating the out-of-sync block in an address space maintained for blocks of the virtual disk, and transmitting a resync command to a replication module of a coordinating node at the secondary site, the resync command identifying the out-of-sync block within the address space.

20 Claims, 10 Drawing Sheets

REDUCING DATA AMPLIFICATION WHEN RESYNCHRONIZING COMPONENTS OF AN OBJECT REPLICATED ACROSS DIFFERENT SITES

BACKGROUND

Distributed systems allow multiple clients in a network to access a pool of shared resources. For example, a distributed storage system allows a cluster of host computers to aggregate local disks (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local disks that make up the datastore may have different performance characteristics (e.g., capacity, input/output per second (IOPS) capabilities, etc.), usage of such shared local disks to store virtual disks or portions thereof may be distributed among the virtual machines based on the needs of each given virtual machine. Accordingly, in some cases, a virtual disk of a virtual machine may be partitioned into different data chunks that are distributed among and stored by local disks of hosts in the datastore. In addition, as a way to enhance reliability in the distributed storage system, in some cases, different levels of fault tolerance techniques may be used. For example, a virtual disk may be replicated into multiple copies and stored as chunks by local disks of a number of host computers in the cluster.

In some cases, host computers in the cluster that store chunks of a virtual disk may be spread across multiple geographically distinct sites or data centers. For example, one or more host computers storing several chunks of a virtual disk may be located at a data center in one city while another one or more host computers storing other chunks of the virtual disk may be located at another data center in another city. In such cases, I/O operations between a host computer, in charge of coordinating all copies of the virtual disk, at one of the data centers and the other host computers storing copies of the virtual disk at the other data center would be performed over the network (e.g., wide area network (WAN)). However, performing I/O operations, over a WAN between two geographically distinct sites, in some case, results in data amplification. As an example, a set of I/O operations resulting in data amplification occurs when the coordinating host computer is resynchronizing a copy of the virtual disk stored by host computers located at a geographically distinct site.

DETAILED DESCRIPTION

Figure 1:
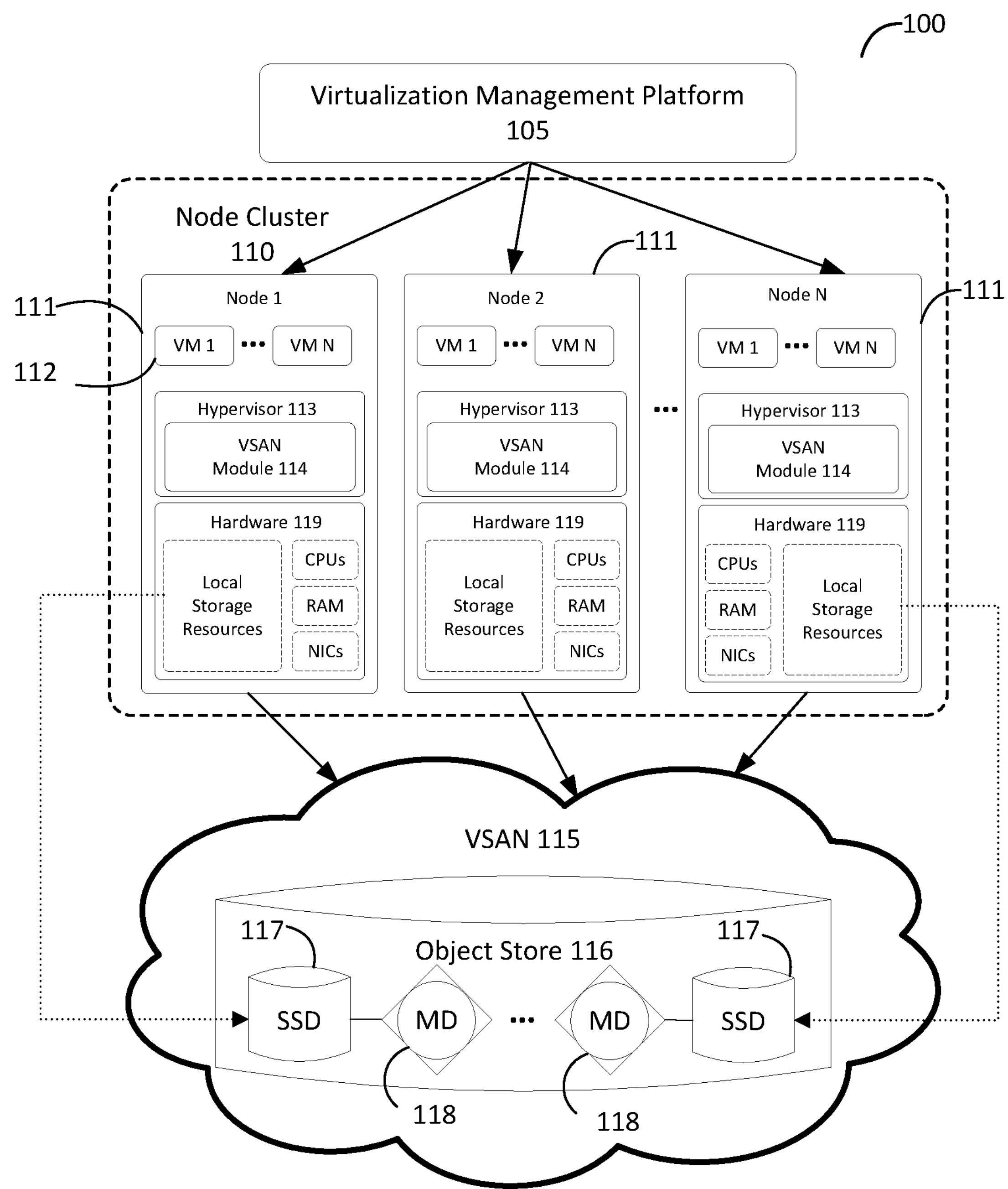
FIG. 1 illustrates an example computing environment in which embodiments may be practiced.

FIG. 1 illustrates a computing environment 100 in which embodiments may be practiced. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers or nodes 111 of a cluster 110 to provide an aggregate object store 116 to virtual machines (VMs) 112 running on the nodes. The local commodity storage housed in or otherwise directly attached to the nodes 111 may include combinations of solid state drives (SSDs) 117 and/or magnetic or spinning disks 118. In certain embodiments, SSDs 117 serve as a read cache and/or write buffer in front of magnetic disks 118 to increase I/O performance. As further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with physical storage resources of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes the SSDs 117 and magnetic disks 118 of a node 111). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described below, each hypervisor 113, through its corresponding VSAN module 114, provides access to storage resources located in hardware 119 (e.g., SSDs 117 and magnetic disks 118) for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. In such an embodiment, VSAN module 114 provides access to a conceptual "VSAN" 115 through which an administrator can create a number of top-level "device" or namespace objects that are backed by object store 116. For example, during creation of a device object, the administrator specifies a particular file system for the device object (such device objects hereinafter also thus referred to "file system objects") such that, during a boot process, each hypervisor 113 in each node 111 discovers a /vsan/ root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may then dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as VMware Inc.'s distributed or clustered file system, VMFS, which is designed to provide concurrency control among simultaneously accessing VMs. Because VSAN 115 supports multiple file system objects, it is able to provide storage resources through object store 116 without being confined by limitations of any particular clustered file system. For example, many clustered file systems can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical, "composite" object that is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module, in embodiments as further described below) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in one embodiment as further described below) traverses a hierarchy of objects using the metadata in the in-memory database in order to properly route an I/O operation request to the node (or nodes) that houses (house) the actual physical local storage that backs the portion of the virtual disk that is subject to the I/O operation.

In some embodiments, one or more nodes 111 of node cluster 110 may be located at a geographical site that is distinct from the geographical site where the rest of nodes 111 are located. For example, some nodes 111 of node cluster 110 may be located at building A while other nodes may be located at building B. In another example, the geographical sites may be more remote such that one geographical site is located in one city or country and the other geographical site is located in another city or country. In such embodiments, any communications (e.g., I/O operations) between the DOM sub-module of a node at one geographical site and the DOM sub-module of a node at the other remote geographical site are performed through a network, such as a wide area network ("WAN").

Figure 2:
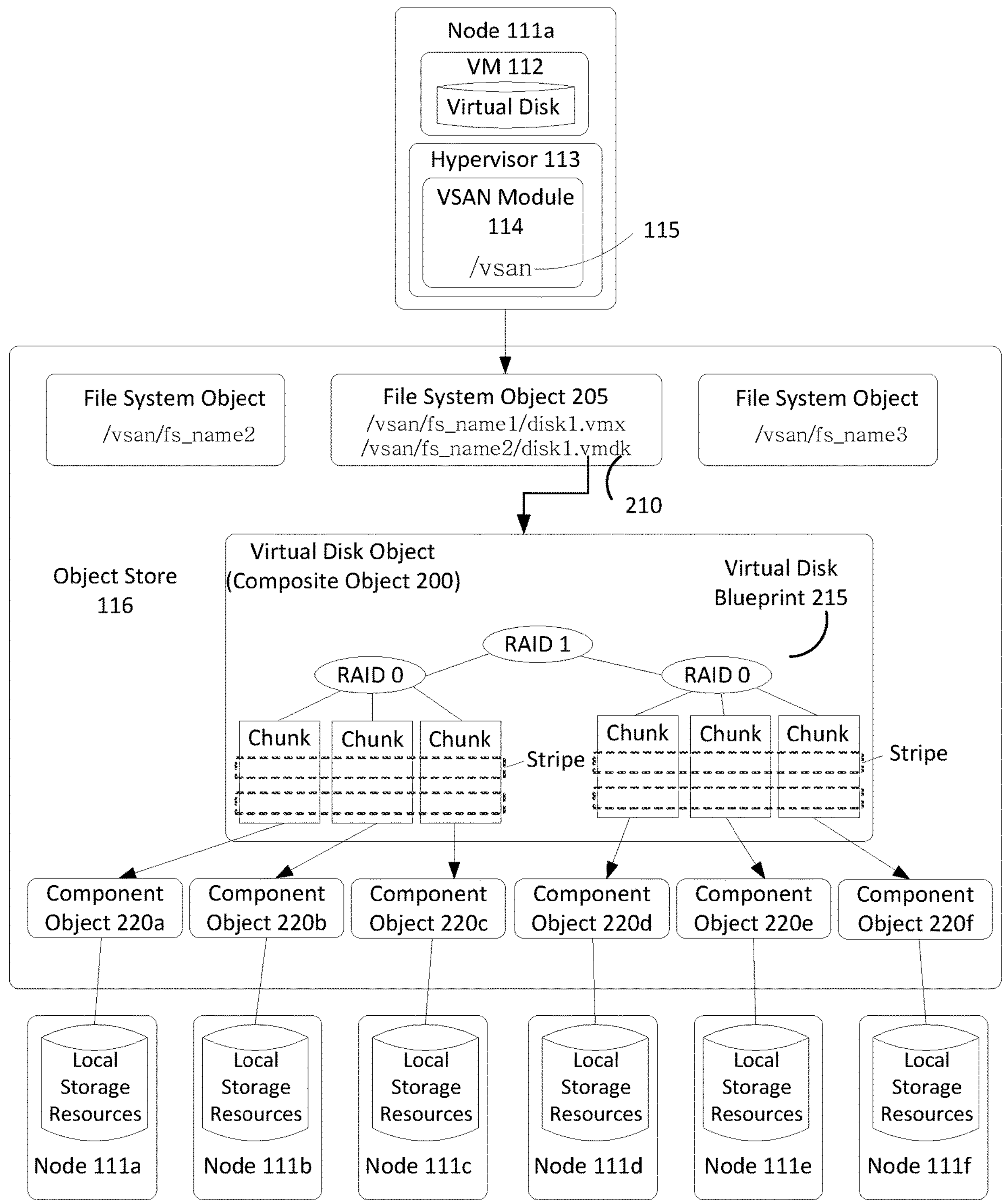
FIG. 2 illustrates an example hierarchical structure of objects organized within an object store that represent a virtual disk.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object). For example, VSAN module 114, by querying its local copy of the in-memory metadata database, is able to identify a particular file system object 205 (e.g., a VMFS file system object in one embodiment, etc.) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk.

Figure 4:
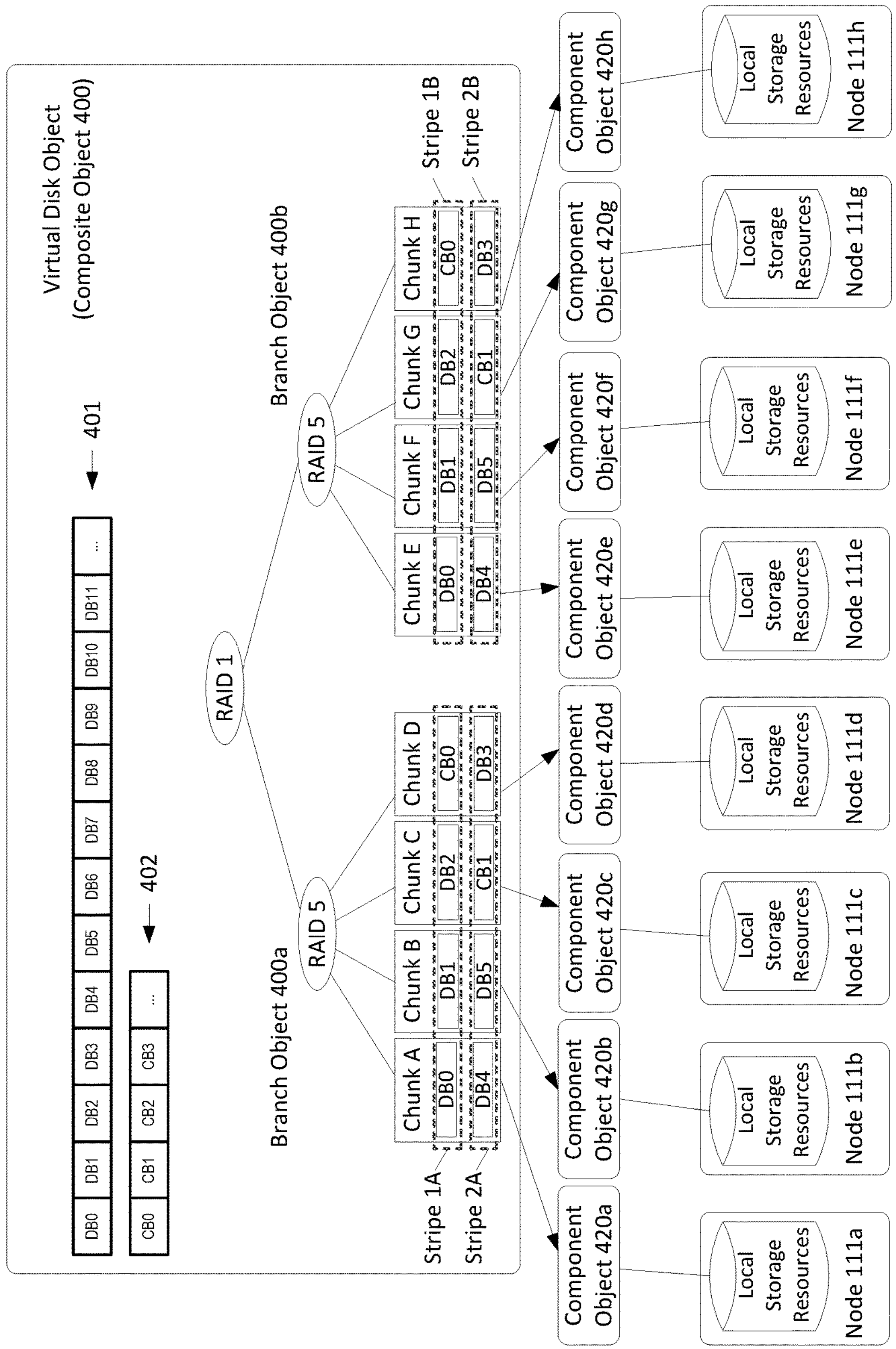
FIG. 4 illustrates an example of applying erasure coding to a virtual disk object.

Depending on the desired level of fault tolerance or performance efficiency, a virtual disk blueprint 215 may direct that data corresponding to composite object 200 be stored in the datastore in a variety of ways. FIG. 2 shows composite object 200 that includes a virtual disk blueprint 215 describing a RAID 1 configuration where two mirrored copies of the virtual disk (e.g., mirrors) are each further striped in a RAID 0 configuration. Data striping refers to segmenting logically sequential data, such as a virtual disk. Each stripe may contain a plurality of data blocks (e.g., DB1, DB2, DB3 in stripe 1 of composite object 200). In some cases, as illustrated in FIG. 4, each stripe may also include one or more code blocks (e.g., RAID 5). As shown, the stripes are then split vertically into different groups of blocks, referred to as chunks, where each chunk is logically represented as a "leaf" or "component" object that composite object 200 contains a reference to. The metadata accessible by VSAN module 114 in the in-memory metadata database for each component object 220 provides a mapping to or otherwise identifies a particular node 111 in cluster 110 that houses the physical storage resources (e.g., magnetic disks 118, etc.) that actually store the chunk (as well as the location of the chunk within such physical resource).

Figure 3:
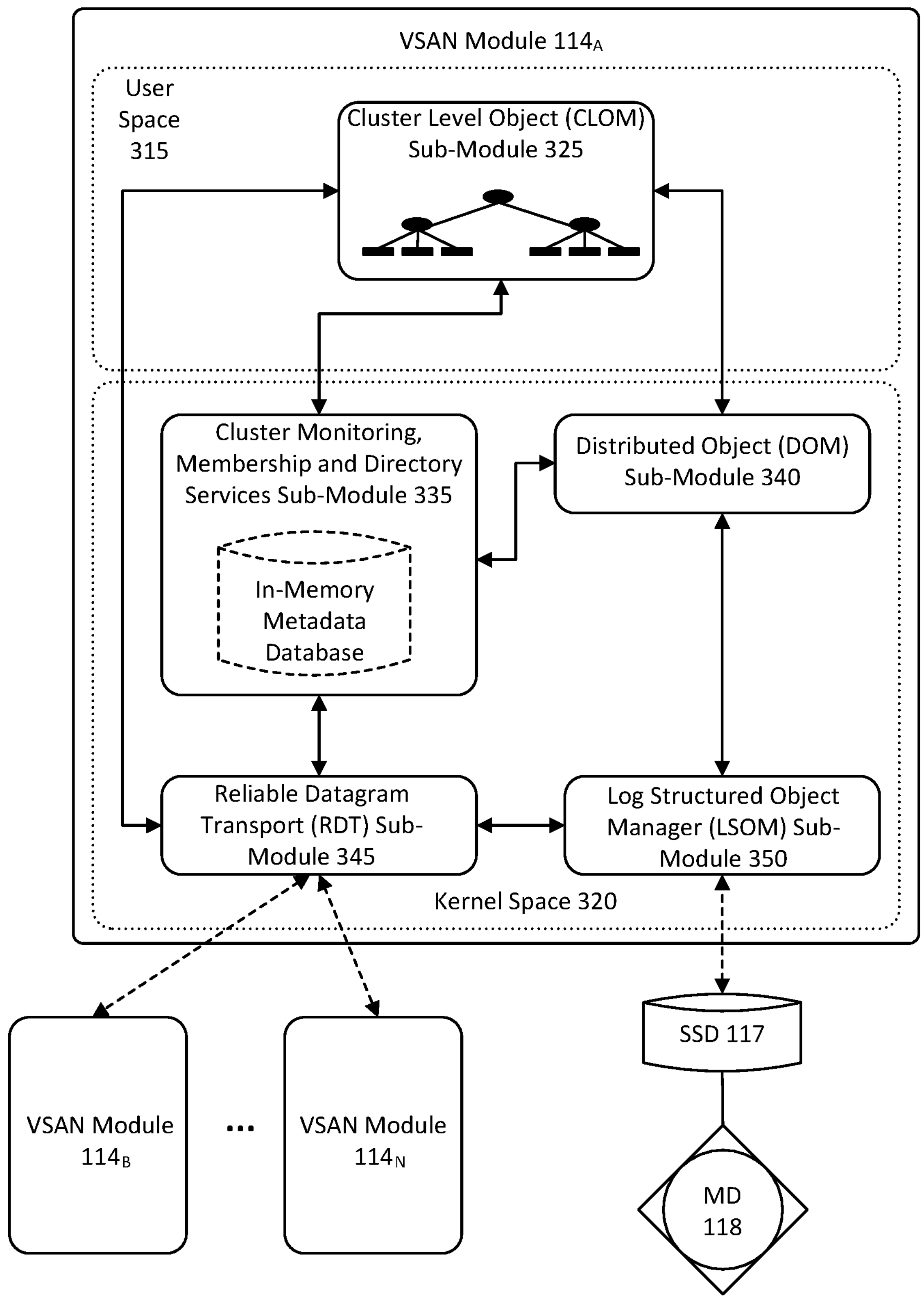
FIG. 3 illustrates components of a VSAN module.

FIG. 3 illustrates components of a VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In one embodiment, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/chunks of the virtual disk to achieve load balancing, etc.). For example, CLOM sub-module 325, in one embodiment, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., chunks) of the composite object to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., chunks) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network (e.g., local area network (LAN), or WAN) with a different DOM sub-module 340 in a second node 111 (or nodes) that serves as the coordinator for the particular component object (e.g., chunk, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of the node running the VM would also have to communicate across the network (e.g., LAN or WAN) with the DOM sub-module 340 of the coordinator. In certain embodiments, if the VM issuing the I/O operation resides on node that is different from the coordinator of the virtual disk object subject to the I/O operation, the two DOM sub-modules 340 of the two nodes may communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which nodes 111 should serve as the coordinators for the virtual disk object as well as its corresponding component objects. Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In one embodiment, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

In some cases, one or more nodes 111 within node cluster 110 may fail or go offline, resulting in a loss of the data and/or code blocks stored by such nodes. In such cases, the distributed storage system or VSAN environment 100 has to be able to tolerate such a failure and efficiently reconstruct the missing data blocks. In some other cases, a node 111 may go offline temporarily and then come back online resulting in some out-of-sync data blocks. To address such cases, the distributed storage system is configured with fault tolerance technologies to resync such out-of-sync data and/or code blocks. Accordingly, to increase performance efficiency and fault tolerance, distributed storage systems (e.g., VSAN environment 100) may implement a variety of fault tolerance technologies, such as the various levels of RAID and/or erasure coding, etc. As described above in relation to FIG. 2, depending on the required level of performance and fault tolerance, virtual disk blueprint 215 may direct that composite object 200 be distributed in one of several ways. In some embodiments, one or a combination of RAID levels (e.g. RAID 0 to RAID 6) is used, where each RAID level or a combination thereof provides a different level of fault tolerance and performance enhancement.

Referring back to FIG. 2, for example, FIG. 2 illustrates an example of the application of RAID 1, which entails creating a replica of composite object 200. This is to ensure that a second copy (e.g., branch object 200*b*) of composite object 200 is still available if a first copy (e.g., branch object 200*a*) is lost due to some sort of failure (e.g. disk failure etc.).

In addition to RAID 1, FIG. 2 also illustrates the application of RAID 0 to the two copies of composite object 200 (branch object 200*a* and branch object 200*b*, created as a result of RAID 1). Under RAID 0, each copy of composite object 200 is partitioned into smaller data stripes, where each stripe is further segmented into a number of data blocks (e.g., DB1, DB2, DB3, in the first stripe, and DB4, DB5, DB6, in the second stripe) and distributed across local storage resources of various nodes in the datastore. In some cases, striping a copy of composite object 200 over local storage resources of various nodes enhances performance as compared to storing the entire copy of composite object 200 in a single node. This is because striping the data means that smaller amounts of data are written to or read from local storage resources of multiple nodes in parallel, thereby reducing the amount of time to complete a particular read or write operation. However, multiplying the number of nodes used to store the various chunks of data increases the probability of failure, and thus data loss.

To achieve an even higher level of fault tolerance, erasure coding is applied in some embodiments. Erasure coding (EC) is a method of data protection in which each copy of a composite object is partitioned into stripes, expanded and encoded with redundant data pieces, and stored across different nodes of the datastore. For example, a copy of the composite object is organized or partitioned into stripes, each of which is broken up into N equal-sized data blocks. Erasure codes are then used to encode an additional M equal-sized code block(s) (interchangeably referred to as "parity blocks") from the original N data blocks, where N is a larger number than M.

The M equal-sized code block(s) then provide fault tolerance and enable reconstruction of one or more lost data blocks in the same stripe should one or more of the underlying nodes fail. More specifically, each code block includes parity values computed from the N data blocks in the same stripe using an erasure coding algorithm. An application of an exclusive OR (i.e., XOR) operation to the N data blocks of the stripe, for computing a code block, is one example of applying an erasure coding algorithm, in which case the computed code block contains the XOR of data corresponding to the N data blocks in the stripe. In such an example, if one of the N data blocks is lost due a failure of its underlying node, it is then able to be reconstructed by performing an XOR operation of the remaining data blocks as well as the computed code block in the same stripe. Depending on the level of fault tolerance desired, different erasure codes are applied in creating the one or more M code blocks. RAID 5 and RAID 6 are common examples of applying erasure coding. In RAID 5, an exclusive OR (i.e. XOR) operation is performed on multiple data blocks to compute a single parity block. An example of the application of RAID 5 in a distributed storage system is illustrated in FIG. 4.

FIG. 4 shows each copy of composite object 400 (i.e., branch object 400*a* and branch object 400*b*) being erasure coded with a 3+1 ratio, such that each copy is partitioned into multiple stripes (e.g. stripes 1A-NA, stripes 1B-NB), where each stripe is further broken up into 3 data blocks (N) and 1 code block (M) (e.g. 3+1 ratio). As shown, the stripes are then split vertically into different groups of blocks, referred to as chunks, where each chunk is logically represented as a component object (e.g., component object 420*a*) that composite object 400 contains a reference to. As shown in FIG. 4, the chunks of data are then distributed across nodes 111 based on a defined distribution logic (i.e., virtual disk blueprint), which in the embodiment of FIG. 4 is the logic of RAID 5.

This defined distribution logic for distributing data and code blocks of a branch object is applied at the time when the branch object is being written stripe by stripe. For branch object 400*a*, whose metadata defines a logical address space 401 for its data blocks and a logical address space 402 for its code blocks, when the first three data blocks (data blocks 0, 1, and 2) of stripe 1A are ready to be written, a code block is first generated by applying an EC (e.g., XOR operation) to the three data blocks resulting in code block (code block 0). Subsequently, the defined distribution logic described above is applied to direct the order of distribution for the three data blocks (data blocks 0, 1, and 2) and one code block (code block 0) across the chunks.

Under the defined distribution logic of RAID 5, code blocks of each stripe of data are distributed across different chunks, such that, for instance, code block 0 of stripe 1A is stored in chunk D of node 111*d* while code block 1 of stripe 2A is stored in chunk C of node 111*c*. This is because, if all the code blocks were stored in one node, such as node 111*d*, all the code blocks may be lost in the event that node 111*d* fails and, therefore, the corresponding data blocks may no longer be reconstructable in case of multiple node failures. Accordingly, continuing with the example of branch object 400*a* above, the first three data blocks and the code block are distributed sequentially such that data block 0 is stored in chunk A, data block 1 is stored in chunk B, data block 2 is stored in chunk C, and code block 0 is stored in chunk D. Moving to the next stripe, stripe 2A, the next three data blocks 3-5and code block 1, generated using data blocks 3-5, are distributed across the nodes in a similar manner, except they are stored in chunks D, A, B, and C, respectively. For the next stripe, data blocks 6-8 and code block 2 generated using data blocks 6-8 are stored in chunks C, D, A, and B, respectively. Similarly, data blocks 9-11 and code block 3 generating using data blocks 9-11 are stored in chunks B, C, D, and A, respectively. Subsequent blocks of stripes are distributed across the nodes according to the defined distribution logic described above.

In the event that a data block is lost or needs to be resynced due to a node failing or going offline, the data blocks may be reconstructed or resynced by performing an XOR of the related blocks in a corresponding stripe on the remaining operational disk drives or nodes. Accordingly, any N number of blocks, including a code block, are sufficient to reconstruct or resync a data block. For example, if node 111*b* goes offline and disconnects from the system, after node 111*b* comes back online and reconnects to the distributed storage system, some or all blocks in chunk B of branch object 400*a* (e.g. data block 1 of stripe 1A and data block 5 of stripe 2A, etc.) may need to be resynchronized. This is because during the time period when node 111*b* is offline, any write request to one or more blocks of chunk B will fail, resulting in the one or more blocks of chunk B being out-of-sync.

In one embodiment, whether a data block within a chunk needs resyncing or not is indicated by a resyncing bitmap for that chunk, which is created from tracking bitmaps that are instantiated when that chunk went offline. For example, assuming that node 111*a* is selected as a coordinating node for branch object 400*a*, when a node (e.g., node 111*b*) storing a chunk of the branch object 400*a* goes offline, DOM sub-module 340 of VSAN module 114 of coordinating node 111*a* records a LSN (latest write sequence number) at the time the chunk went offline and persists this information to all the online nodes. In addition, DOM sub-module 340 of each of the online nodes creates a tracking bitmap corresponding to the recorded LSN, and updates that tracking bitmap each time it performs a write operation to a chunk of that node.

At the time the offline node comes back online, DOM sub-module 340 of the coordinating node creates a resyncing bitmap for the entire logical address space of the out-of-sync chunk. In some embodiments, each hit in the resyncing bitmap corresponds to a block in the logical address space of the out-of-sync chunk. In one embodiment, DOM sub-module 340 of the coordinating node creates the resyncing bitmap based on the recorded. LSN and the tracking bitmaps corresponding to the recorded LSN as follows.

First, DOM sub-module 340 of the coordinating node initializes all bits of the resyncing bitmap to zero. Then, DOM sub-module 340 of the coordinating node locates a block in one of the chunks associated with the recorded LSN+1. After determining this offset, DOM sub-module 340 of the coordinating node traverses the blocks of all the chunks, beginning with the block in one of the chunks associated with the recorded LSN+1 until all of the bits in the tracking bitmaps have been accounted for. The order of traversal is determined according to the defined distribution logic (e.g., A-B-C-D, D-A-B-C, C-D-A-B, R-C-D-A). During the traversal, DOM sub-module 340 of the coordinating node sets the bit in the resyncing bitmap corresponding to each block of the out-of-sync chunk that is traversed to one.

As an example, let's assume node 111*e* temporarily goes offline, thereby rendering some of the data and/or code blocks of chunk E out-of-sync. After node 111*e* comes back online. DOM sub-module 340 of the coordinating node detects that node 111*e* has come back online and creates a resyncing bitmap, as described above, corresponding to the logical address space of chunk E. Next, to select an out-of-sync block of chunk E to resync, DOM sub-module 340 of the coordinating node examines chunk E's resyncing bitmap for bits set to one. For each bit set to one, DOM sub-module 340 locates a block corresponding to that bit in the logical address space of the chunk, and selects that block as an out-of-sync block. For example, DB4 of chunk E may be selected by DOM sub-module 340 for resyncing based on the resyncing bitmap of chunk E.

To resync DB4, in some embodiments, DOM sub-module 340 first identifies DB4's corresponding blocks (i.e., DB5, CB1, and DB3) in the same stripe (i.e., stripe 2B), based on the mapping of the blocks, and then determines the physical addresses of where those blocks are stored in each of nodes 111*f*, 111*g*, and 111*h*, respectively. Subsequently, DOM sub-module 340 generates and transmits read operations to nodes 111*f*, 111*g*, and 111*h* in order to read the contents of DB5, CB1, and DB3, respectively, from their respective physical addresses. Having read the contents of DB5, CB1, and DB3, DOM sub-module 340 uses an erasure coding engine to perform an XOR operation of the blocks that results in a "delta," which is data that DOM sub-module 340 failed to write to DB4 when node 111*e* was offline. Next, DOM sub-module 340 issues and transmits a write request to node 111*e* in order to write the delta to the physical address of where DB4 is stored in node 111*e* and, therefore, resync it.

As described above in relation to FIG. 1, however, in some embodiments, one or more nodes 111 of node cluster 110 may be located at a geographical site that is distinct from the geographical site where other nodes 111 are located. In such embodiments, resyncing one or more component objects mapped to nodes that are located at a site that is geographically distinct from where the coordinating node is located results in data amplification. Examples of such data amplification are illustrated by FIG. 5, which shows a composite object being replicated across two sites with an application of RAID 1+RAID 1, as well as FIG. 8, which shows a composite object being replicated across two sites with an application of RAID 1+RAID 5.

Figure 5:
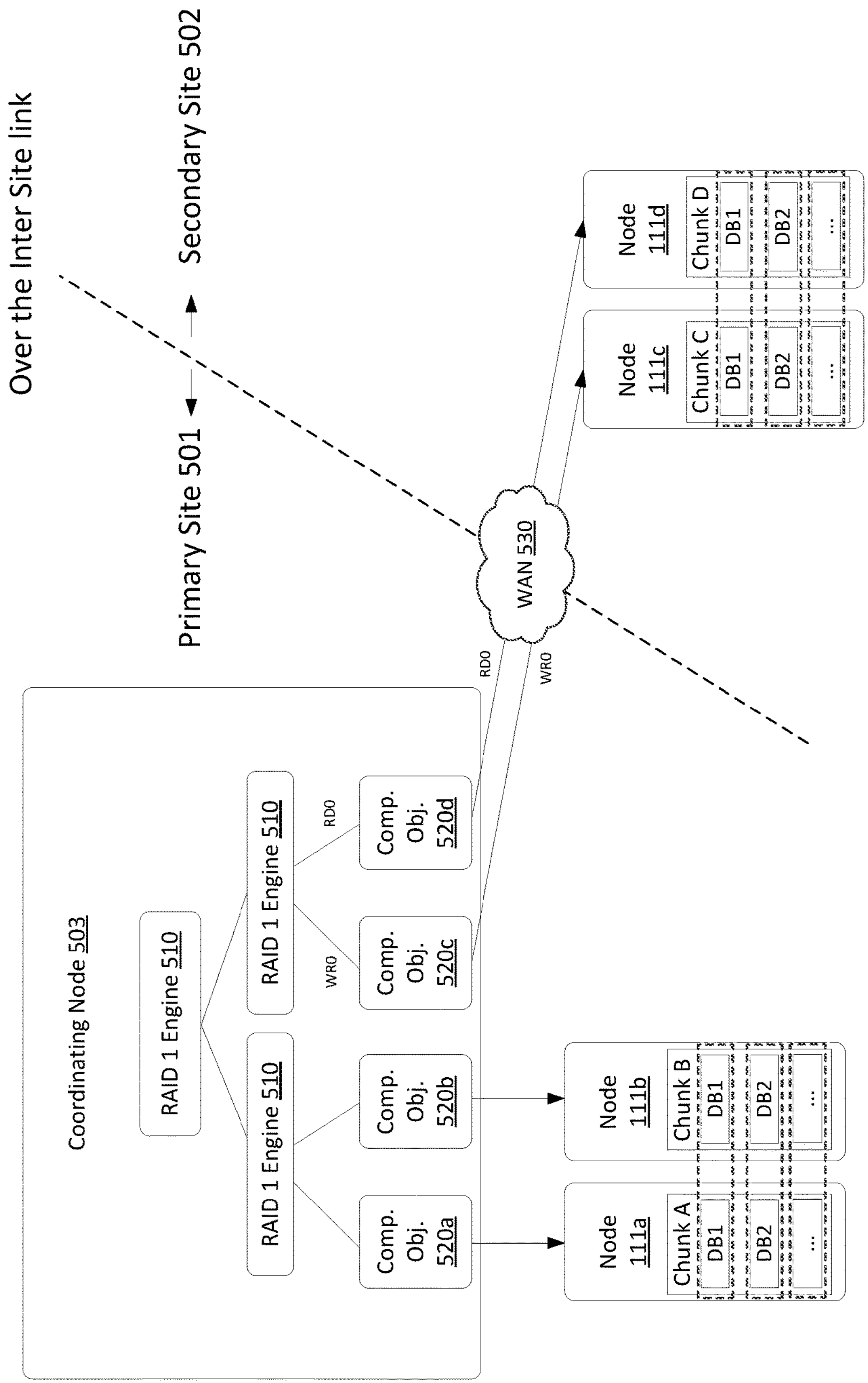
FIG. 5 illustrates an example of a virtual disk object being replicated across two geographically distinct sites.

FIG. 5 illustrates an example where node 111*a* and node 111*b* are located at primary site 501 while node 111*c* and node 111*d* are located at secondary site 502. In some embodiments, nodes 111*a* and 111*b* are connected together via a LAN at primary site 501 and nodes 111*c* and 111*d* are connected together via a LAN in secondary site 502. Further, one or more of nodes 111*a* and 111*b* may communicate with one or more of nodes 111*c* and 111*d* through WAN 530.

FIG. 5 also illustrates a composite object being replicated across two sites by the application of RAID 1. As described above, when creating a virtual disk or virtual disk object for a VM 112 through VSAN module 114 of a node within the cluster, an administrator configures a storage policy or profile reflecting the storage requirement of the virtual disk. Also during the creation of the virtual disk object, as described in relation to FIG. 3, a node is selected and configured to serve as a "coordinator" or "owner" (e.g., coordinating node 503) that controls access to the virtual disk object.

Based on the storage policy created by the administrator, CLOM sub-module 325 of coordinating node 503 (or the node creating the object, if different) then generates a virtual disk blueprint (e.g., virtual disk blueprint 215) that is stored in the in-memory metadata database. Also stored as metadata for the composite object is an indication of the type of RAID engine for the application of the different levels of RAID, such as RAID 1, to any payload generated for the composite object. This indication may be provided by a pointer to code, corresponding to the type of RAID engine, in the memory of coordinating node 503. RAID 1 engine 510 is a logical representation of a type of RAID engine used to distribute data corresponding to component objects 520*a*-520*d* of the composite object across various nodes in the cluster based on the virtual disk blueprint.

As an example, an administrator may configure a storage policy to ensure that a virtual disk is replicated four times and stored by four different nodes across two geographically distinct sites (e.g., primary site 501 and secondary site 502). Based on such a storage policy, in some embodiments, CLOM sub-module 325 generates a virtual disk blueprint such that any data generated for the composite object is mirrored into four copies or component objects (i.e., component objects 520*a*, 520*b*, 520*c*, 520*d*). This entails two consecutive applications of RAID 1 to any payload generated for the composite object. A logical representation of the resulting virtual disk blueprint is illustrated by FIG. 5, where a first application of RAID 1 by RAID 1 engine 510 to the composite object results in two branch objects and a second application of RAID 1 by RAID 1 engine 510 to each branch object results in four component objects 520*a*, 520*b*, 520*c*, 520*d*.

Having created the virtual disk blueprint, CLOM sub-module 325 then communicates it to DOM sub-module 340 to map each of the four component objects of the composite object to a node (e.g., nodes 111*a*, 111*b*, 111*c*, and 111*d*) that has been selected to store the data corresponding to the component object. Based on the mapping performed by DOM sub-module 340, an RDT connection is then established by RDT sub-module 345 for each component object 520 between coordinating node 503 and a node (e.g., node 111*a*-111*d*) selected to store data corresponding to the component object. All I/O operations are then performed through these RDT connections. For example, any payload generated for the composite object is mirrored into four copies and stored as chunks A-D in their respective nodes 111*a*-111*d* through the RDT connections established by RDT sub-module 345 between coordinating node 503 and nodes 111*a*-111*d*.

In some cases, storing chunks C and Din nodes 111*c* and 111*d* of secondary site 502 may be beneficial because any incident occurring at primary site 501, resulting in both nodes 111*a* and 111*b* being inaccessible, may not impact chunks C and D stored at secondary site 502. However, because the two sites are located at a distance from each other, any I/O operations between the nodes located at primary site 501 and the nodes located at secondary site 502 are transmitted over WAN 530. Such transmission of I/O operations between primary site 501 and secondary site 502 over WAN 530 results in amplification of data transmission between the two sites (referred to herein as "data amplification") in cases where a virtual disk is replicated across the two sites, as shown in FIG. 5.

An example of such data amplification occurs when coordinating node 503 performs resyncing operations for a component object mapped to one of nodes 111*c* or node 111*d*. If node 111*d* goes offline for a short period of time and then comes back online, some data blocks of chunk D may be out-of-sync. To resync the out-of-sync data blocks of chunk D, as described above in relation to FIG. 4, DOM sub-module 340 of coordinating node 503 first creates a resyncing bitmap for chunk D based on tracking bitmaps as described in U.S. patent application Ser. No. 15/621,130, filed Jun. 13, 2017, entitled "Code Block Resynchronization for Distributed Multi-Mirror Erasure Coding System" (hereinafter "the '130 application"), the entire contents of which are incorporated by reference herein. Next, DOM sub-module 340 examines the resyncing bitmap for bits set to one. For each bit set to one, DOM sub-module 340 then locates a block corresponding to that bit in the logical address space of chunk D, and selects that block as an out-of-sync block. For example, DB2 of chunk D may be the first block selected by DOM sub-module 340 for resyncing based on the resyncing bitmap of chunk D.

To resync DB2 of chunk D, DOM sub-module 340 generates and transmits a read operation (RDO) to node 111*c* in order to read the contents of DB2 of chunk C, which is an up-to-date replica or copy of out-of-sync DB2 of chunk D. Next, DOM sub-module 340 of coordinating node 503 transmits a write request to node 111*d* in order to write the contents of chunk C's DB2 into the physical address of where DB2 of chunk D is stored in node 111*d*.

As a result of the resyncing operation described above, a read request (RD0) and a write request (WR0), each including payload, are transmitted over WAN 530. Unnecessary transmission of data over WAN 530, however, is not only suboptimal but also results in additional network traffic, the transmission of which leads to additional costs being incurred for the client. Accordingly, the embodiments described herein relate to configuring a leader node at primary site 501 and a proxy node at secondary site 502 to reduce data amplification when resyncing a component object mapped to a node at secondary site 502 (e.g., component object 520*d* mapped to node 111*d*).

Figure 6:
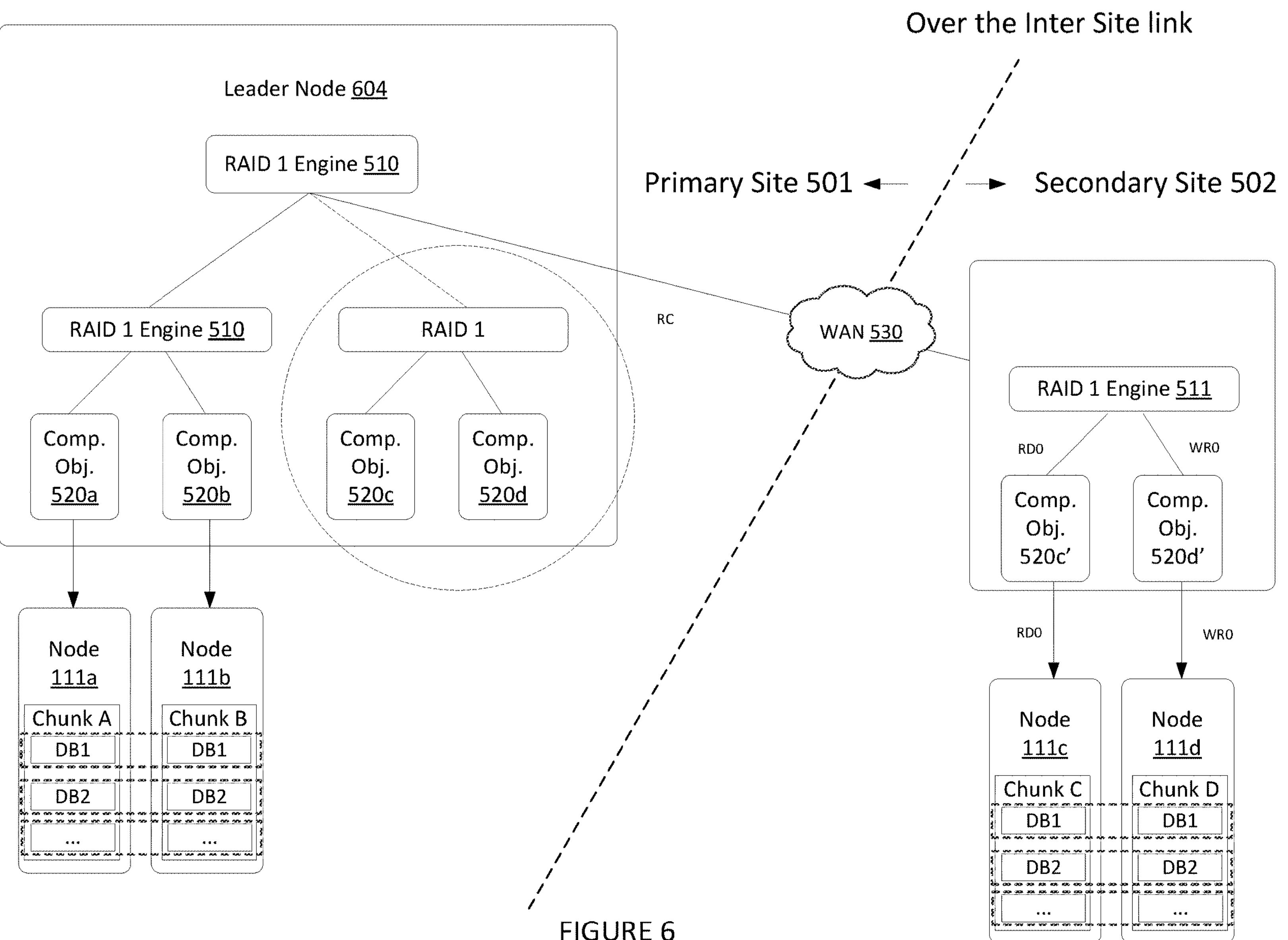
FIG. 6 illustrates an example of a leader node and a proxy node configured for reducing data amplification across two geographically distinct sites of FIG. 5.

FIG. 6 illustrates an example of an embodiment for reducing data amplification across two sites (i.e., primary site 501 and secondary site 502) by configuring a leader node 604 at primary site 501 and a proxy node 605 at secondary site 502. FIG. 6 shows the same environment, including the same components, as FIG. 5 with the exception of leader node 604 and proxy node 605. Similar to FIG. 5, in the embodiment of FIG. 6, the storage policy configured by the administrator requires that the virtual disk be replicated four times and stored by four different nodes across two geographically distinct sites (e.g., primary site 501 and secondary site 502). As a result, a composite object, including component objects 520*a*-520*d*, is created based on a virtual disk blueprint generated by CLOM sub-module 325. A full memory representation of the composite object is stored in the in-memory metadata database of leader node 604. As described above in relation to FIG. 5, DOM sub-module 340 then maps component objects 520*a*-520*d* to nodes 111*a*-111*d*, respectively.

In contrast to FIG. 5, however, in the embodiment of FIG. 6, once VSAN module 114 of the coordinating node determines that the storage policy requires the replication of the virtual disk at a remote node, instead of selecting a single coordinating node (e.g., coordinating node 503 of FIG. 5), VSAN module 114 proceeds with selecting and configuring leader node 604 at primary site 501 and also selecting and configuring proxy node 605 at secondary site 502.

Leader node 604 performs the same responsibilities as coordinating node 503 of FIG. 5, with the exception that no RDT connections are established, for component objects 520*c* and 520*d*, between leader node 604 and nodes 111*c* and 111*d*, respectively. Instead, as described below, proxy node 605 is selected and configured as a proxy coordinating node whose RDT sub-module 345 establishes RDT connections for component objects 520*c*' and 520*d*' (copies of component objects 520*c* and 520*d*, respectively, whose memory representations are stored at proxy node 605) between proxy node 605 and one or more nodes 111*c*-111*d* at secondary site 502. Component objects 520*c* and 520*d* whose memory representations are stored at leader node 604 and have no RDT connections to nodes 111*c* and 111*d* are shown in a dotted circle. Although no RDT connections are established for component objects 520*c* and 520*d* between nodes 111*c*-111*d* and leader node 604, component objects 520*c* and 520*d* still subscribe to CMMDS entries made with CMMDS sub-module 335 of leader node 604 relating to nodes 111*c* and 111*d*. This allows CMMDS sub-module 335 of leader node 604 to provide VSAN module 114 of leader node 604 as well as other nodes in the cluster with information about the state of nodes 111*c* and 111*d*. As an example, if node 111*c* goes offline, VSAN module 114 of leader node 604 is notified based on changes in CMMDS entries relating to node 111*c* that component object 520*c* subscribed to.

To configure a node to act as a proxy node (e.g., proxy node 605), VSAN module 114 of leader node 604 first selects one of the nodes from among the nodes at secondary site 502 (e.g., nodes 111*c* and 111*d*) that have been mapped to component objects 520*c* and 520*d*. Subsequently, VSAN module 114 of leader node 604 transmits an operation to the selected node to configure it as a proxy coordinating node.

In some embodiments, the payload of the operation includes a copy of a part of the virtual disk blueprint of the composite object (copy of the memory representation for component objects 520*c* and 520*d*), which indicates the distribution logic of the composite object across secondary site 502. In other words, in the embodiment of FIG. 6, the part of the virtual disk blueprint indicates that component objects 520*c*' and 520*d*' are replicates of each other. Receiving the part of the virtual disk blueprint, therefore, enables proxy node 605 to determine how data received from leader node 604 is to be distributed among component objects 520*c*' and 520*d*' as well as how an out-of-sync data block (e.g., DB2) of a component object (e.g., component object 520*d*') at secondary site 502 can be resynced by using contents of a corresponding up-to-date data block (e.g., DB2) of a replicate component object (e.g., component object 520*c*').

Proxy node 605 stores the part of the virtual disk blueprint in the in-memory metadata database, shown as component objects 520*c*' and 520*d*', and uses it to establish one or more RDT connections with one or more nodes at secondary site 502. In the embodiment of FIG. 6, for example, if node 111*c* is selected as proxy node 605, RDT sub-module 345 of node 111*c* then establishes an RDT connection with node 111*d* for transmitting data relating to component object 520*d*' to node 111*d*.

The payload of the operation also includes an indication about the type of RAID engine for use by VSAN module 114 of proxy node 605 to distribute data and perform resyncing operations based on the part of the virtual disk blueprint. In some embodiments, the indication is a pointer to code stored in the memory of proxy node 605. RAID 1 engine 511 provides a logical representation of the type of RAID engine that proxy node 605 would utilize to distribute data received for component objects 520*c*' and 520*d*'.

Accordingly, after a node selected from secondary site 502 receives the operation from leader node 604, it is configured to act as a proxy coordinating node by locally applying appropriate RAID logic to distribute data and perform resyncing operations, as requested by leader node 604, for component objects 520*c*' and 520*d*'. Therefore, in the embodiment of FIG. 6, for example, leader node 604 orchestrates the resyncing of a component object by transmitting a resync operation to proxy node 605 including an indication about the component object and, more specifically, the offset and length of a data block that needs to be resynced. Proxy node 605 then performs the resync operation locally by using up-to-date component objects stored in nodes at the secondary site without there being a need for communicating data payload across WAN 530.

Figure 7:
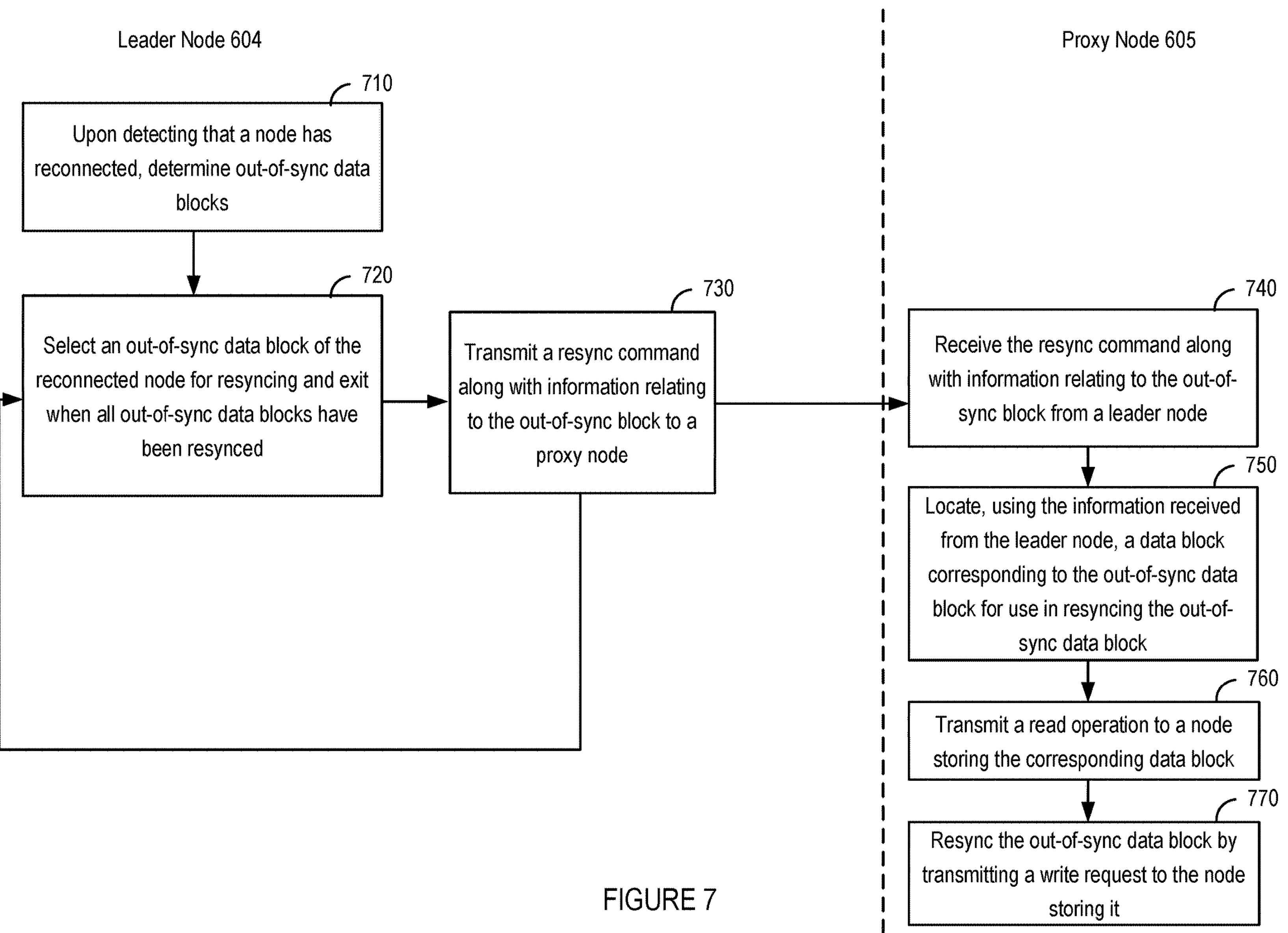
FIG. 7 illustrates example operations for use by the leader node and the proxy node of FIG. 6 when resyncing a component of the virtual disk object, of FIG. 5, stored at a secondary site.

FIG. 7 illustrates example operations for resyncing a data block of one of the component objects of FIG. 6, in accordance with some embodiments. As described above, a node (e.g., node 111*d*) at secondary site 502 may go offline temporarily and come back online. This may result in one or more data blocks of a corresponding component object (e.g., component object 520*d*') stored in the node to go out-of-sync.

The operations begin at 710 responsive to DOM sub-module 340 of leader node 604 detecting that node 111*d*, which had been offline, has reconnected. Upon detecting the reconnection, DOM sub-module 340 creates the resyncing bitmap corresponding to the logical address space of chunk D of the reconnected node 111*d* as described in the '130 application. In some embodiments, each bit in the resyncing bitmap corresponds to a block, which has a certain defined size or length, in the logical address space of the out-of-sync thunk. In some embodiments, the length or size of data blocks of a composite object is selected, (e.g., by an administrator/user) when the composite object is being created, and stored at metadata associated with the composite object.

At 720, DOM sub-module 340 of leader node 604 selects an out-of-sync block of the reconnected node 111*d* to resync. To select an out-of-sync block, DOM sub-module 340 examines the resyncing bitmap created at 710 for bits set to one. For each bit set to one, DOM sub-module 340 locates a block corresponding to that bit in the logical address space of chunk D and selects that block as an out-of-sync. block, For example, DOM sub-module 340 locates DB2 as an out-of-sync block, which has an offset of 1 in the logical address space of chunk Das well as a defined length of, for example, 1 MB.

At 730, DOM sub-module 340 of leader node 604 transmits a resync command (RC) along with information relating to the out-of-sync data block to proxy node 605 over WAN 530. More specifically, DOM sub-module 340 of leader node 604 determines that there are no RDT connections established for component objects 520*c* and 520*d* between leader node 604 and nodes 111*c* and 111*d*, respectively, and that proxy node 605 has been selected for coordinating operations relating to component objects 520*c* and 520*d*. As such, when a proxy node, such as proxy node 605, is configured in a multi-site cluster and has an out-of-sync component object, leader node 604 only transmits a resync command with information about the out-of-sync data block to proxy node 605 and allow it to perform the resyncing locally by referring to a copy of the memory representation of component objects 520*c* and 520*d* (shown as component objects 520*c*' and 520*d*'). In some embodiments, the information includes the offset and length of the selected out-of-sync data block as well as an indication about which component object the data block belongs to. In the example above, DB2's offset is 1, its length is 1 MB, and the component object that DB2 belongs to is component object 520*d'*.

At 740, proxy node 605 receives the resync command as well as the information transmitted by leader node 604.

At 750, DOM sub-module 340 of proxy node 605 locates a corresponding data block to use in resyncing the out-of-sync block based on the information received from leader node 604. For example, based on the resync command and information received from leader node 604, DOM sub-module 340 of proxy node 605 first determines that a data block, at offset 1 and with length 1 MB, of component object 520*d*' is out-of-sync and needs to be resynced by using another component object at secondary site 605. DOM sub-module 340 of proxy node 605 then consults the part of the virtual disk blueprint, received from leader node 604, and determines that component object 520*c*' is a replicate of component object 520*d*' and can be used to resync the out-of-sync data block DB2.

As component objects 520*c*' and 520*d*' are replicates, they have identical logical address spaces for their corresponding chunks C and D, respectively, meaning that the offset and length of DB2 of chunk C is the same as the offset and length of DB2 of chunk D. Accordingly, using the offset and length of out-of-sync data block DB2 of chunk D, DOM sub-module 340 of proxy node 605 then locates the logical block address of DB2 of chunk C. In some embodiments, as described above, the logical block address of DB2 of chunk C, points to a physical address of where data corresponding to DB2 is physically stored within the local storage resources of node 111*c*.

At 760, DOM sub-module 340 of proxy node 605 transmits a read request, including the physical address of the corresponding data block, to the node storing the corresponding data block. In the example above, DOM sub-module 340 of proxy node 605 transmits a read request (RDO) to node 111*c* (through an RDT connection established for component object 520*c*' between proxy node 605 and node 111*c*) to fetch the data stored at the physical address of where DB2 of chunk C is stored in node 111*c*.

At 770, DOM sub-module 340 of proxy node 605 resvncs the out-of-sync data block by transmitting a write request (WR0), including data fetched at step 760 as well as the physical address of the out-of-sync data block, to the node storing the out-of-sync data block (through an RDT connection established for component object 520*d*' between proxy node 605 and node 111*d*). The physical address of the out-of-sync data block is found by locating the logical block address of the out-of-sync block, using its offset and length, which provides a pointer to where in the local resources of the underlying node the out-of-sync data blocks is stored. In the example above, DOM sub-module 340 of proxy node 605 transmits a write request, with the data fetched from DB2 of chunk C as well as the physical address of where out-of-sync DB2 of chunk D is stored, to node 111*d*.

As shown in FIG. 7, after resyncing the first out-of-sync data block, leader node 604 continues with steps 720 and 730 until all out-of-sync blocks, as indicated by the resyncing bitmap, are accounted for.

Accordingly, in contrast to FIG. 5 where DOM sub-module 340 of coordinating node 503 communicated a large amount of data with the nodes at secondary site 502, configuring a leader node at primary site 501 and a proxy node secondary site 502 reduces the number of I/O requests and the amount of payload that needs to be sent over WAN 530 for resync operations relating to component objects mapped to the nodes at secondary site 502, as described above.

Figure 8:
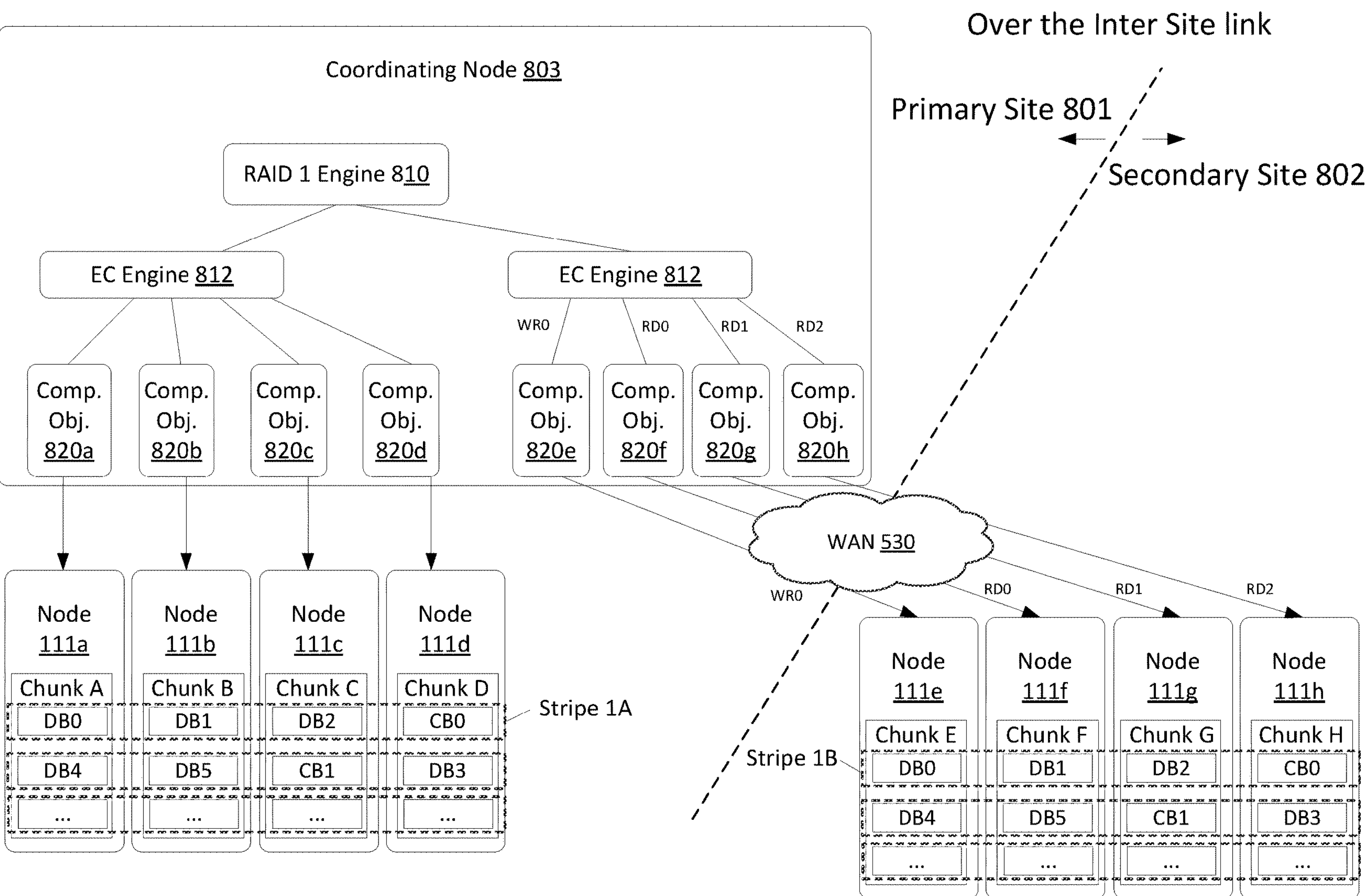
FIG. 8 illustrates an example of a virtual disk object being replicated and erasure coded across two geographically distinct sites.

FIG. 8 illustrates another example of a multi-site cluster of nodes similar to the cluster shown in FIG. 5, except that instead of two consecutive applications of RAID 1, FIG. 8 illustrates the application of RAID 1 in combination with the application of RAID 5 (performed by EC engines 812), resulting in component objects 820*a*-820*h*. As described in relation to FIG. 5, without selecting and configuring a node at secondary site 802 to act as a proxy coordinating node, RDT connections are established between coordinating node 803 and all of nodes 111*a*-111*h*, spread across primary site 801 and secondary site 802, for component objects 820*a*-820*h*. As a result, any I/O operation issued by coordinating node 803 for one of component objects 820*e*-820*h* is transmitted by coordinating node 803 to the corresponding node (i.e., nodes 111*e*-111*h*) over WAN 530, which results in data amplification.

An example of resyncing DB4 of chunk E stored in node 111*e* was described in relation to FIG. 4. In such an example, when nodes 111*e*-111*h* are located at a geographically distinct site (such as in the embodiment of FIG. 8), all I/O operations for resyncing DB4 are performed over WAN 530. For example, as described in relation to FIG. 4, DOM sub-module 340 of coordinating node 803 transmits read operations RD0, RD1, and RD2 to nodes 111*f*, 111*a*, and 111*h* in order to read the contents of DB5, CB1, and DB3, respectively, which results in data payload corresponding to such data/code blocks being transmitted over WAN 530.

Subsequently, DOM sub-module 340 of coordinating node 803 transmits a write operation WR0, including the block recreated by the local EC engine 812 based on the read blocks, to node 111*e* for resyncing DB4 of chunk E over WAN 530.

Accordingly, as described by the example above, without configuring a node at secondary site 802 to act as a proxy node, resyncing a data/code block of the composite object of FIG. 8 results in a significant amount of payload being transmitted over WAN 530.

Figure 9:
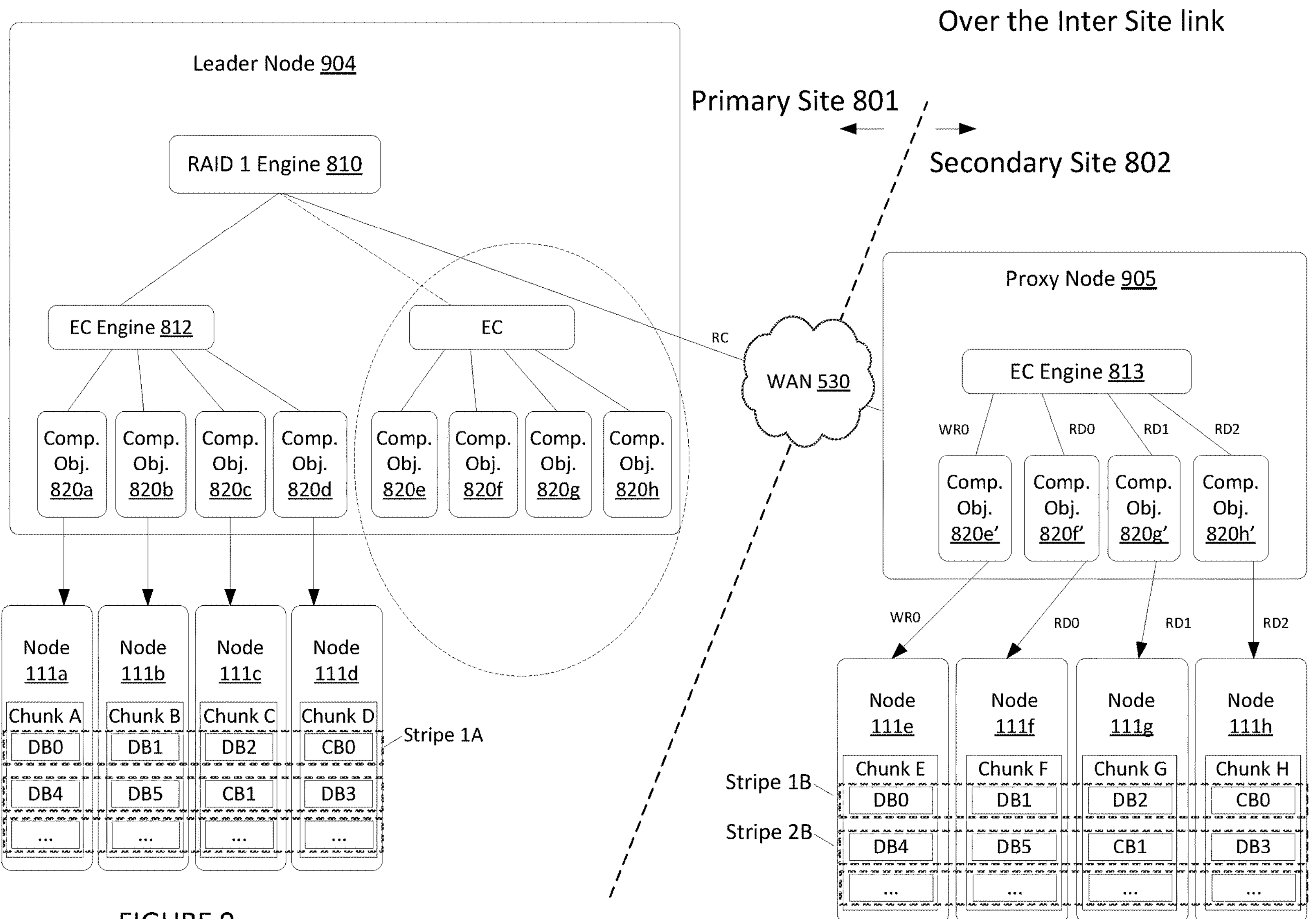
FIG. 9 illustrates an example of a leader node and a proxy node configured for reducing data amplification across two geographically distinct sites of FIG. 8.

FIG. 9 illustrates an example of an embodiment for reducing data amplification across two sites (i.e., primary site 801 and secondary site 802) by selecting and configuring a leader node 904 at primary site 801 and a proxy node 905 at secondary site 802. FIG. 9 shows the same environment, including the same components, as FIG. 8 with the exception of leader node 904 and proxy node 905. Leader node 904 and proxy node 905 are configured in a manner similar to the configuration of leader node 905 and proxy node 905, respectively. Accordingly, leader node 904 establishes no RDT connections with nodes 111*e*-111*h* for component objects 820*e*-820*h*. Instead RDT connections are established for component objects 820*e*'-820*h*' between proxy node 905 and nodes 111*e*-111*h*, respectively.

Further, as described in relation to FIG. 6, to configure a proxy node, leader node 904 first selects a node from among nodes 111*e*-111*h* and transmits an operation to the selected node. The payload of the operation includes a copy of a part of the virtual disk blueprint of the composite object (copy of the memory representation for component objects 820*e*-820*h*) that indicates how payload generated for one or more of component objects 820*e*-820*h* is to be distributed among nodes 111*e*-111*h* located at secondary site 802. Proxy node 905 stores the part of the virtual disk blueprint, shown as component objects 820*e*'-820*h*', in the in-memory metadata database and uses it to establish one or more RDT connections with one or more nodes at secondary site 802. Also, as described above, the virtual disk blueprint of the composite object of FIG. 9 involves the application of RAID 5 (i.e., a common example of erasure coding) to each of the branch objects. Accordingly, unlike FIG. 6 where the payload included an indication about the type of RAID engine, the payload for configuring proxy node 905 includes an indication about the type of EC engine for use by proxy node 905 to perform RAID 5 processing. In some embodiments, the indication may be a pointer to code stored in the memory of proxy node 905. EC engine 812 provides a logical representation of the type of EC engine for enabling VSAN module 114 of proxy node 905 to locally perform erasure coding, thereby allowing proxy node 905 to locally distribute payload received from leader node 904 as well as locally perform resync operations for the component objects at secondary site 802. Accordingly, having configured proxy node 905, leader node 904 only orchestrates resyncing of data/code blocks of component objects 820*e*-820*g* by transmitting a resync operation, along with information relating to the out-of-sync data/code block, to proxy node 905 and further allowing proxy node 905 to perform the resync operations locally at secondary site 802 by referring to a copy of the memory representation of component objects 820*e*-820*h* (shown as component objects 820*e*'-820*h*').

Figure 10:
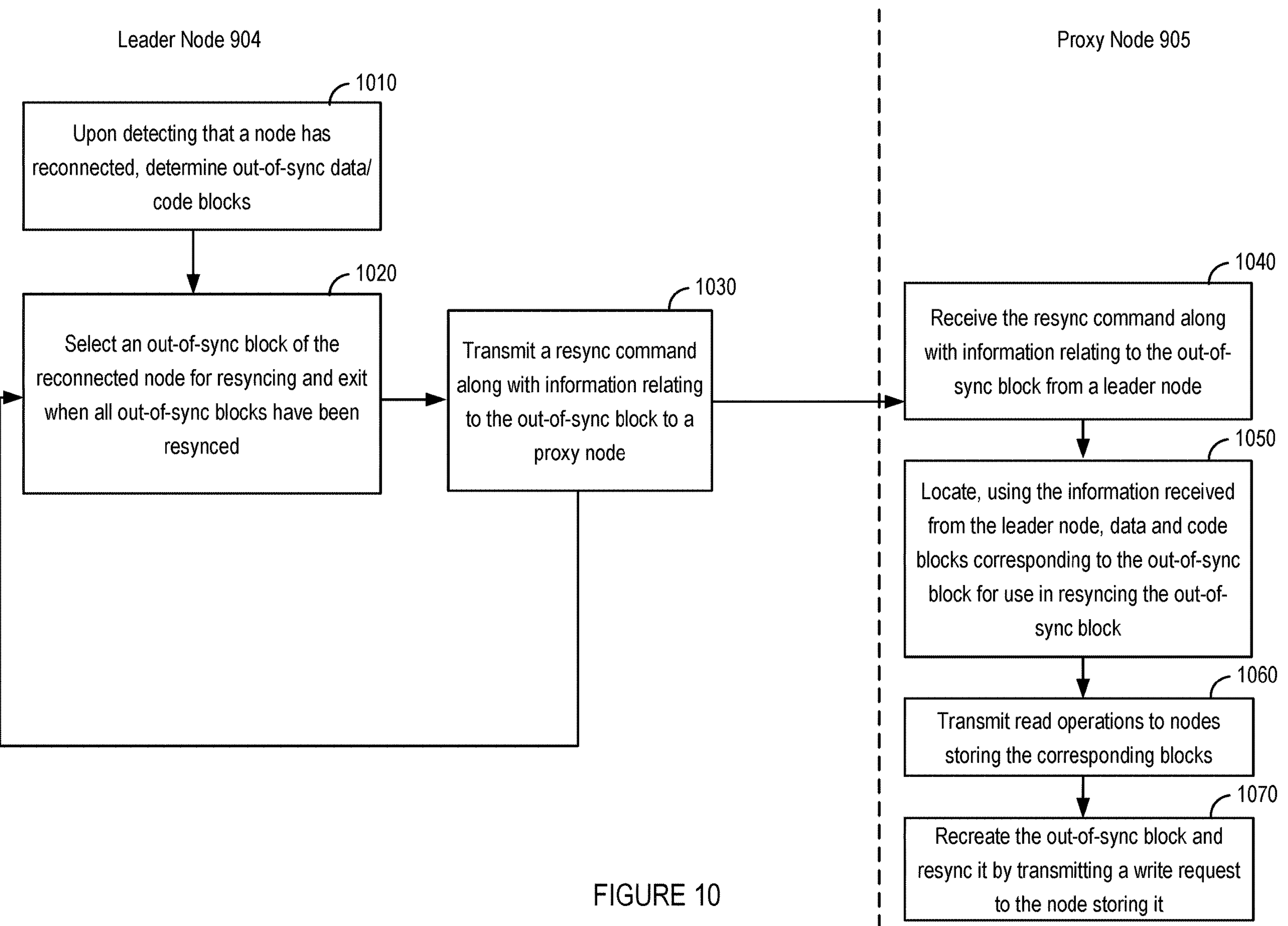
FIG. 10 illustrates example operations for use by the leader node and the proxy node of FIG. 9 when resyncing a component of the virtual disk object, of FIG. 8, stored at a secondary site.

FIG. 10 illustrates example operations for resyncing a data/code block of one of the component objects of FIG. 8, in accordance with some embodiments. As described above, a node (e.g., node 111*e*) at secondary site 802 may go offline temporarily and come back online. This may result in one or more data/code blocks of a corresponding component object (e.g., component object 820*e*') stored in the node to go out-of-sync.

The operations begin at 1010 responsive to DOM sub-module 340 of leader node 904 detecting that node 111*e*, that had been offline, reconnected. Upon detecting the reconnection, DOM sub-module 340 creates the resyncing bitmap corresponding to the logical address space of chunk E of the reconnected node 111*e* as described in the '130 application. in some embodiments, each bit in the resyncing bitmap corresponds to a block, which has a certain defined size or length, in the logical address space of the out-of-sync chunk.

At 1020, DOM sub-module 340 of leader node 904 selects an out-of-sync block of the reconnected node 111*e* to resync. To select an out-of-sync block, DOM sub-module 340 examines the resyncing bitmap created at 1010 for bits set to one. For each bit set to one, DOM sub-module 340 locates a block corresponding to that bit in the logical address space of chunk E and selects that block as an out-of-sync block. For example, DOM sub-module 340 locates DB4 as an out-of-sync block, which has an offset of 1 in the logical address space of thunk E as well as a defined length of, for example, 1 MB.

At 1030, DOM sub-module 340 of leader node 904 transmits a resync command (RC) along with information relating to the out-of-sync data block to proxy node 905 over WAN 530, More specifically, DOM sub-module 340 of leader node 904 determines that there are no RDT connections established for component objects 820*e*-820*h* between leader node 904 and nodes 111*e*-111*h*, respectively, and that proxy node 905 has been selected for coordinating operations relating to component objects 820*e*-820*h* by referring to a copy of the memory representation of component objects 820*e*-820*h* (shown as component objects 820*e*'-820*h*'). As such, when a proxy node, such as proxy node 905, is configured in a multi-site cluster and has an out-of-sync component object, leader node 904 only transmits a resync command with information about the out-of-sync data/code block to proxy node 905 and allow it to perform the resyncing locally. In some embodiments, the information includes the offset and length of the selected out-of-sync data/code block as well as an indication about which component object the data/code block belongs to. In the example above, DB4's offset is 1, its length is 1 MB, and the component object that DB4 belongs to is component object 820*e*'.

At 1040, proxy node 905 receives the resync command as well as the information transmitted by leader node 904.

At 1050, DOM sub-module 340 of proxy node 905 locates corresponding data/code blocks to use in resyncing the out-of-sync block based on the information received from leader node 904. For example, based on the resync command and information received from leader node 904, DOM sub-module 340 of proxy node 905 first determines that a data block, at offset 1 and with length 1 MB, of component object 820*e*' is out-of-sync and needs to be resynced by using one or more other component objects at secondary site 802. DOM sub-module 340 of proxy node 905 then consults the part of the virtual disk blueprint, received from leader node 904, and determines that component objects 820*e*'-820*h*' are mapped together in a RAID 5 configuration. As a result, DB4 of chunk E can be resynced using DB5, CB1, and DB3 of the same stripe 2B.

Subsequently, DOM sub-module 340 of proxy node 905 locates the logical block addresses of DB5, CB1, and DB3 in the logical address spaces of the corresponding chunks F, G, and H. Each of the logical block addresses points to a physical address where each of the data/code blocks are stored in their associated node.

At 1060, DOM sub-module 340 of proxy node 905 transmits a number of read requests, including the physical addresses of the corresponding data/code blocks, to the nodes storing the corresponding data/code block. In the example above, DOM sub-module 340 of proxy node 905 transmits three read requests, R0, R1, R2, to nodes 111*f*, 111*g*, and 111*h* (through RDT connections established for component objects 820*f*'-820*h*' between proxy node 905 and nodes 111*f*-111*h*, respectively) to fetch the data stored at the physical addresses of where those data/code blocks are stored, Subsequently, EC engine 813 reads the contents of DB5, CB1, and DB3 and performs and XOR operation to recreate the out-of-sync block that DOM sub-module 340 of proxy node 905 failed to write to DB4 when node 111*e* was offline. In embodiments where, for example, instead of a data block such as DB4, the out-of-sync block is a code block, such as code block CB1 of node 111*g*, EC engine 813 reads the contents of DB4, DB5 and DB3 to perform an XOR operation and compute a new code block.

At 1070, DOM sub-module 340 of proxy node 905 resyncs the out-of-sync data/code block by transmitting a write request (WRO) (through an RDT connection established for component object 820*e*' between proxy node 905 and node 111*e*), including the physical address of the out-of-sync data block, to the node storing the out-of-sync data block. The physical address of the out-of-sync data block is found by locating the logical block address of the out-of-sync block, using its offset and length, which provides a pointer to where in the local resources of the underlying node the out-of-sync data blocks is stored. In the example above, DOM sub-module 340 of proxy node 905 transmits a write request, with the delta computed by EC engine 813 as well as the physical address of where DB4 of chunk E is stored, to node 111*e*, In the embodiments where the out-of-sync block is code block, such as CB1 of node 111*g*, proxy node 905 transmits a write request, with the newly computed code block as well as the physical address of where CB1 of chunk G is stored, to node 111*g*.

As shown in FIG. 10, after resyncing the first out-of-sync data/code block, leader node 904 continues with steps 1020 and 1030 until all out-of-sync blocks, as indicated by the resyncing bitmap, are accounted for.

As a result, in contrast to FIG. 8 where DOM sub-module 340 of coordinating node 803 communicated a large amount of data with the nodes at secondary site 802, configuring a leader node at primary site 801 and a proxy node secondary site 802 reduces the number of I/O requests and the amount of payload that needs to be sent over WAN 530 for resync operations.

Embodiments described above may be extended to distributed storage systems where an object is replicated at more than two sites. In addition, embodiments described above similarly apply in cases where an application of an erasure coding algorithm results in more than one code block, such as ones employing a 6+2 coding scheme or a 9+3 coding scheme.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and datastores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method of resynchronizing component objects of a virtual disk, that are backed by first storage nodes, which are at a primary site, and second storage nodes, which are at a secondary site, comprising:

at a coordinating node at the primary site, responsive to an out-of-sync storage node from the second storage nodes coming back online, identifying an out-of-sync block of the out-of-sync storage node, locating the out-of-sync block in an address space maintained for blocks of the virtual disk, and transmitting a resync command to a coordinating node at the secondary site, the resync command identifying the out-of-sync block within the address space, wherein in response to the resync command the coordinating node at the secondary site resyncs the out-of-sync block using at least one of one or more data blocks and one or more code blocks stored locally at the secondary site in one or more of the second storage nodes other than the out-of-sync storage node.

2. The method of claim 1, wherein the address space is maintained for data blocks of the virtual disk and the out-of-sync block is one of the data blocks.

3. The method of claim 1, wherein the address space is maintained for code blocks of the virtual disk and the out-of-sync block is one of the code blocks, and each of the code blocks is generated by performing an erasure coding operation on data blocks of the virtual disk, wherein the code blocks of the virtual disk comprise the one or more code blocks stored locally at the secondary site in one or more of the second storage nodes other than the out-of-sync storage node, and wherein the data blocks of the virtual disk comprise the one or more data blocks stored locally at the secondary site in one or more of the second storage nodes other than the out-of-sync storage node.

4. The method of claim 3, further comprising:

at the coordinating node at the primary site, maintaining first metadata for the code blocks of the virtual disk including the out-of-sync block, the first metadata defining the address space maintained for the code blocks, and maintaining second metadata for the data blocks of the virtual disk, the second metadata defining the address space maintained for the data blocks.

5. The method of claim 3, wherein the coordinating node at the secondary site resyncing the out-of-sync block comprises the coordinating node at the secondary site generating contents for the out-of-sync block by performing a mathematical operation on the contents of the at least one of one or more data blocks and one or more code blocks stored locally at the secondary site in one or more of the second storage nodes other than the out-of-sync storage node, and writing the generated contents to the out-of-sync block at the out-of-sync storage node.

6. The method of claim 5, wherein the coordinating node at the secondary site includes an erasure coding engine that performs the mathematical operation.

7. The method of claim 1, wherein the coordinating node at the secondary site resyncing the out-of-sync block comprises the coordinating node at the secondary site reading contents from one of the second storage nodes other than the out-of-sync storage node and writing the contents into the out-of-sync block at the out-of-sync storage node, wherein the contents are stored in a data block or a code block of the at least one of one or more data blocks and one or more code blocks.

8. The method of claim 7, wherein the coordinating node at the secondary site uses a RAID 1 engine for performing the reading and the writing.

9. A non-transitory computer readable storage medium comprising instructions that are executable in a computer system to cause the computer system to perform a method of resynchronizing component objects of a virtual disk, that are backed by first storage nodes, which are at a primary site, and second storage nodes, which are at a secondary site, the method comprising:

responsive to an out-of-sync storage node from the second storage nodes coming back online, identifying an out-of-sync block of the out-of-sync storage node;

locating the out-of-sync block in an address space maintained for blocks of the virtual disk; and transmitting a resync command to a coordinating node at the secondary site, the resync command identifying the out-of-sync block within the address space, wherein in response to the resync command the coordinating node at the secondary site resyncs the out-of-sync block using at least one of one or more data blocks and one or more code blocks stored locally at the secondary site in one or more of the second storage nodes other than the out-of-sync storage node.

10. The non-transitory computer readable medium of claim 9, wherein the address space is maintained for data blocks of the virtual disk and the out-of-sync block is one of the data blocks, and wherein the data blocks of the virtual disk comprise the one or more data blocks stored locally at the secondary site in one or more of the second storage nodes other than the out-of-sync storage node.

11. The non-transitory computer readable medium of claim 9, wherein the address space is maintained for code blocks of the virtual disk and the out-of-sync block is one of the code blocks, and each of the code blocks is generated by performing an erasure coding operation on data blocks of the virtual disk, and wherein the code blocks of the virtual disk comprise the one or more code blocks stored locally at the secondary site in one or more of the second storage nodes other than the out-of-sync storage node.

12. The non-transitory computer readable medium of claim 11, wherein the method further comprises:

maintaining first metadata for the code blocks of the virtual disk including the out-of-sync block, the first metadata defining the address space maintained for the code blocks; and maintaining second metadata for the data blocks of the virtual disk, the second metadata defining the address space maintained for the data blocks.

13. A computer system for resynchronizing component objects of a virtual disk, which are at a primary site, and second storage nodes, which are at a secondary site, comprising:

a coordinating node at the primary site; and a coordinating node at the secondary site, wherein the coordinating node at the primary site is configured to responsive to an out-of-sync storage node coming back online, identify an out-of-sync block of the out-of-sync storage node, locate the out-of-sync block in an address space maintained for blocks of the virtual disk, and transmit a resync command to the coordinating node at the secondary site, the resync command identifying the out-of-sync block within the address space, and the coordinating node at the secondary site is configured to execute the resync command to resync the out-of-sync block using at least one of one or more data blocks and one or more code blocks stored locally at the secondary site in one or more of the second storage nodes other than the out-of-sync storage node.

14. The computer system of claim 13, wherein the address space is maintained for data blocks of the virtual disk and the out-of-sync block is one of the data blocks, and wherein the data blocks of the virtual disk comprise the one or more data blocks stored locally at the secondary site in one or more of the second storage nodes other than the out-of-sync storage node.

15. The computer system of claim 13, wherein the address space is maintained for code blocks of the virtual disk and the out-of-sync block is one of the code blocks, and each of the code blocks is generated by performing an erasure coding operation on data blocks of the virtual disk, and wherein the code blocks of the virtual disk comprise the one or more code blocks stored locally at the secondary site in one or more of the second storage nodes other than the out-of-sync storage node.

16. The computer system of claim 15, wherein the coordinating node at the primary site is further configured to:

maintain first metadata for the code blocks of the virtual disk including the out-of-sync block, the first metadata defining the address space maintained for the code blocks, and maintain second metadata for the data blocks of the virtual disk, the second metadata defining the address space maintained for the data blocks.

17. The computer system of claim 15, wherein the coordinating node at the secondary site resyncing the out-of-sync block comprises the coordinating node at the secondary site generating contents of the out-of-sync block by performing a mathematical operation on the contents of the at least one of one or more data blocks and one or more code blocks stored locally at the secondary site in one or more of the second storage nodes other than the out-of-sync storage node, and writing the generated contents to the out-of-sync block at the out-of-sync storage node.

18. The computer system of claim 17, wherein the coordinating node at the secondary site includes an erasure coding engine that performs the mathematical operation.

19. The computer system of claim 13, wherein the coordinating node at the secondary site resyncing the out-of-sync block comprises the coordinating node at the secondary site reading contents from one of the second storage nodes other than the out-of-sync storage node and writing the contents into the out-of-sync block at the out-of-sync storage node, wherein the contents are stored in a data block or a code block of the at least one of one or more data blocks and one or more code blocks.

20. The computer system of claim 19, wherein the replication module of the coordinating node at the secondary site uses a RAID 1 engine for performing the reading and the writing.

* * * * *